(12) United States Patent
Iwamura et al.

(10) Patent No.: US 6,373,731 B1
(45) Date of Patent: Apr. 16, 2002

(54) SURGE VOLTAGE SUPPRESSED POWER INVERTER USING A VOLTAGE DRIVEN SWITCHING ELEMENT

(75) Inventors: Masahiro Iwamura; Hideki Miyazaki, both of Hitachi; Katsunori Suzuki, Takahagi; Junichi Sakano, Hitachi; Mutsuhiro Mori, Mito; Koji Tateno, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/654,084

(22) Filed: Sep. 1, 2000

(30) Foreign Application Priority Data

Feb. 28, 2000 (JP) .......................................... 2000-055954

(51) Int. Cl.⁷ ............................................... H02H 7/122
(52) U.S. Cl. ................................ 363/56.05; 363/56.12; 363/131; 361/91
(58) Field of Search ........................... 363/56.02, 56.05, 363/56.09, 56.11, 56.12, 98, 131, 132; 323/289; 361/91

(56) References Cited

U.S. PATENT DOCUMENTS

| | | | | |
|---|---|---|---|---|
| 4,709,319 A | * | 11/1987 | Takahashi et al. | ............. 363/49 |
| 5,946,178 A | * | 8/1999 | Bijlenga | ....................... 361/91 |

FOREIGN PATENT DOCUMENTS

| | | |
|---|---|---|
| JP | A-6-326579 | 11/1994 |
| JP | A-9-139660 | 5/1997 |

* cited by examiner

*Primary Examiner*—Peter S. Wong
*Assistant Examiner*—Gary L. Laxton
(74) *Attorney, Agent, or Firm*—Antonelli, Terry, Stout & Kraus, LLP

(57) ABSTRACT

A power inverter using a voltage driven switching element, capable of suppressing an excessive surge voltage which is generated on high-speed switching of IGBTs or MOSFETs, and suppressing radio frequency oscillation after the suppression of the surge voltage. The power inverter includes a switching element rendering a power path conducting and non-conducting, and a speeding-up circuit of a feedback path in an active clamping circuit added to the switching element.

17 Claims, 11 Drawing Sheets

SURGE VOLTAGE SUPPRESSED POWER INVERTER USING A VOLTAGE DRIVEN SWITCHING ELEMENT

BACKGROUND OF THE INVENTION

The present invention relates to a surge voltage suppressed power inverter using a voltage driven switching element such as a MOS transistor and the like.

Various circuits have been practically used as a power inverter using a semiconductor element.

Recently, IGBTs or MOSFETs which can be switched at high speeds have been used as switching elements for the power inverter.

Since the MOS transistors and IGBTs have a high switching speed, the rate of changes in current di/dt and the rate of changes in voltage dv/dt is so high that surge current due to parasitic inductance is very high. Exceeding of the surge voltage beyond the maximum rating of the switching element may cause damages to the element. Accordingly, various surge protection circuits are used.

An example of prior art surge voltage suppressing means is described in JP-A-9-139660. A series circuit of a capacitor and resistor is connected between the collector and emitter of an IGBT in parallel. A diode is connected in parallel with the resistor. This circuit is referred to as a "snubber circuit". Since the circuit is arranged to absorb surge voltage per se by the capacitor, there occurs problem as follows: Firstly, since the capacitor will have higher impedance at low frequencies, sufficient surge suppression is not attained for a surge voltage having a wide time width. Secondly, since the capacitance which is necessary for the capacitor increases in proportional to the parasitic inductance and the square of the cut-off current if the voltage to be absorbed is assumed as constant, a capacitor having a high capacitance higher than the order of several $\mu F$ and high breakdown voltage is necessary. Since such a capacitor is high in price and large in size, this is an obstacle for reduction of the power inverter in size and cost. Thirdly, the power loss of the resistor increases in proportional to the parasitic inductance and the square of the cut-off current if the switching frequency is assumed as constant. Accordingly, a power resistor which has a large size and high price would be required, which prevents the reduction of the power invertor in size, cost and loss. Fourthly, since a capacitor having a high capacitance will deteriorate the operation speed of the switching element, it will make it impossible to conduct pulse width modulation control (PMW) with a high resolution.

Another example of the prior art surge voltage suppressing means is disclosed in JP-A-6-326579. Since a surge voltage which is generated at the drain terminal of a MOS transistor is clamped at a given voltage in present means, a series-connected circuit of a zener-diode and a reverse blocking diode is connected between the gate and the drain of the MOS transistor. When a current flowing through a load is cut off by driving the MOSFET into an non-conductive state, a surge voltage is generated on the drain terminal due to the parasitic inductance. When the surge voltage will exceed the sum of the breakdown voltage and the forward voltage of the zener diode, the voltage on the gate of the MOS transistor will become higher, so that the MOS transistor is turned on to absorb the surge voltage. This circuit is known as so-called "active clamping circuit". The active clamping circuit overcomes the disadvantage of the above-mentioned snubber circuit and has an advantage that the clamped voltage is kept constant independently of the magnitude of the parasitic inductance and the cut-off current.

However, if the active clamping circuit is applied to a MOS transistor having a higher switching speed than that of IGBT, a problem may occur in connection with the surge voltage clamping characteristics in the prior art circuit configuration.

A first problem is that the peak of the surge voltage will exceed a desired clamp voltage. Accordingly, it is necessary to use a switching element having a margin against this clamp voltage and having a higher maximum rated voltage. Since the turn-on resistance of the switching element increases in proportional to the maximum rated voltage, the loss on turning-on increases. Since the switching element having a high maximum rated voltage and a low turn-on resistance has a wider area, it becomes more expensive.

A second problem is voltage oscillation P2 at radio frequencies during the clamping operation and the voltage oscillation at radio frequencies P3 after the completion of the clamping operation (see FIG. 18). Although this oscillation will not cause the breakdown of the switching element due to the surge voltage, there is a risk of causing electromagnetic interference (EMI) noise which may adversely affect to peripheral electronic circuits and devices.

SUMMARY OF THE INVENTION

It is an object of the present invention, to solve above-mentioned problems, to provide a power inverter which is capable of suppressing the peak of surge voltage to a lower level even if a switching element has a higher switching speed and of suppressing radio frequency oscillation after the suppression of the surge voltage.

The present inventors have found that the reason why the peak voltage can not be clamped at a desired voltage is that the formation of a negative feedback path between the drain and the gate of an MOS transistor has a time lag when a surge-voltage occurs. The time lag is caused mainly by an increase in the radio frequency impedance due to the parasitic inductance in the negative feedback path and the time lag due to the forward recovery time of the reverse-blocking diode.

The voltage swinging (oscillation) is a loop oscillation which is inherent in the negative feedback control, that is a resonant oscillation caused by the parasitic inductance and parasitic capacitance.

Based upon the above-mentioned finding, a power inverter according to an aspect of the present invention comprises a circuit for canceling an inductive impedance of a negative feedback path as means for speeding up the negative feedback path extending from the drain of a MOS switching element to the gate thereof and a circuit for shortening the forward recovery period of time of a reverse-blocking diode in the negative feedback path. The power inverter further comprises a circuit for preventing the radio frequency oscillation after the suppression of the surge voltage.

Other objects, features and advantages of the present invention will become more apparent from the following description of the embodiments of the invention taken in conjunction with the accompanying drawings.

DETAILED DESCRIPTION OF THE EMBODIMENTS

Figure 1:
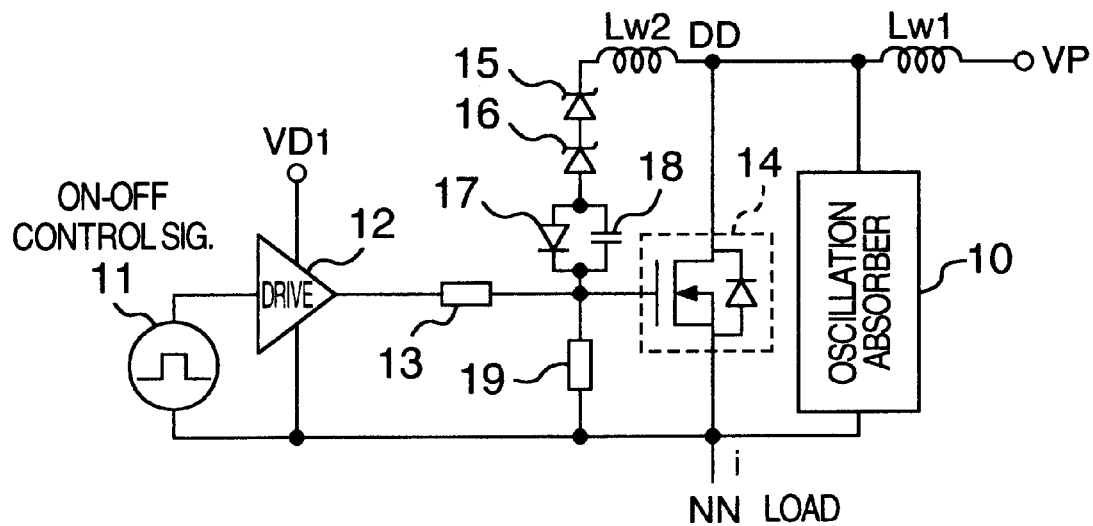
FIG. 1 is a circuit diagram of a power inverter according to a first embodiment of the present invention.

A first embodiment of the present invention is illustrated in FIG. 1. Like elements and like components are designated by like numerals in the following description.

In FIG. 1, reference numerals 11, 12, 13 and 14 denote an on-off control signal, driver, resistor and NMOS transistor, respectively. The output of the driver is connected to the gate of the NMOS transistor 14 via the resistor 13. Reference numerals 15 and 16 denote series-connected constant voltage diodes, each having a cathode connected to the drain of the NMOS transistor 14. A diode 17 has its anode and cathode which are connected to the anode of the constant voltage diode 16 and the gate of the NMOS transistor 14, respectively. A reference Lw1 denotes a parasitic inductance of the wiring of a power source (supply) VP and Lw2 denotes a parasitic inductance which is the total inductance of the inductances of the respective terminals of the constant voltage diodes 15 and 16 and the diode 17 and the inductance of the wiring which is connected therebetween. A reference numeral 10 denotes a radio frequency oscillation absorbing circuit which is connected between the drain and the source of the NMOS transistor.

Now, the operation of this power inverter will be described. When the on-off control signal 11 instructs the turn-on, a high level signal is applied to the gate of the NMOS transistor via the driver 12, so that the NMOS transistor 14 is tuned on. As a result, a current i is supplied to a load (not shown) from the power source VP via the parasitic inductance Lw1 and the NMOS transistor 14. At this time, an electric energy Lw1×i×i/2 is stored in the parasitic inductor Lw1. Since a node DD is at a low potential when the NMOS transistor 14 is conductive, a negative feedback path including series connected constant voltage diodes 15, 16 and the diode 17 is opened due to the fact that the diode 17 is reverse-biased.

When the on-off control signal 11 instructs the turn-off, a lower level signal is applied to the gate of the NMOS transistor 14 via the driver 12, so that the NMOS transistor 14 becomes non-conductive. As a result, the current i which has been supplied to the load (not shown) from the power source VP via the parasitic inductance Lw1 and NMOS transistor 14 is abruptly interrupted. At this time, a kickback voltage Lw1×di/dt is generated at the node DD by the energy which has been stored in the parasitic inductor Lw1. The kickback voltage of the high speed transistor exhibits a very sharp rise-up dv/dt. When this voltage exceeds the clamp voltage which is the sum of the breakdown voltage of the constant voltage diodes 15 and 16 and the forward voltage of the diode 17, a path including the node DD-Lw2, constant voltage diode 15, constant voltage diode 16, resistor 13, driver 12 and node NN is formed to increase the voltage on the gate of the NMOS transistor 14. As a result, the NMOS transistor 14 is turned on to lower the potential on the node DD. In other words, for this period of time, a negative feedback circuit is formed between the node DD and the gate of the NMOS transistor 14. When the kickback voltage becomes lower than the clamp voltage, the negative feedback circuit is opened. The gate voltage is returned to a low level so that the NMOS transistor 14 is turned off. At this time, the voltage on the node DD becomes the same level as that of the power source VP.

The capacitor 18 which is connected in parallel with the diode 17 serves to cancel the inductive impedance of the parasitic inductance Lw2. Since the capacitor 18 is connected in series with the parasitic inductance Lw2, appropriate selection of the capacitance of the capacitor 18 depending upon the value of Lw2 causes the negative feedback path to substantially have a resistive impedance to advance the breakdown of the constant voltage diodes 15 and 16. The cancellation or offset effect of the inductive impedance also advances the forward recovery of the diode 17. Since the diode exhibits high impedance until the forward bias becomes about 0.7 volts or more, the feedback path is not formed. However, the recovery to the forward bias conduction is advanced due to the cancellation effect of the inductive impedance.

Figure 12:
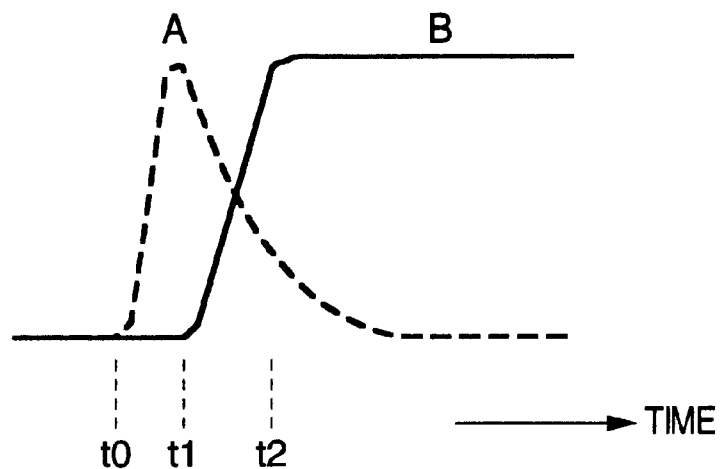
FIG. 12 is a waveform view explaining the time lag of the negative feedback path.

FIG. 12 shows the changes in the current flowing through the negative feedback path when a surge voltage is generated. References A and B denote currents flowing through the capacitor 18 and the diode 17, respectively. As is apparent from FIG. 12, the negative feedback path is formed since time t0 if the capacitor 18 is provided. The formation of the negative feedback path is delayed from time t0 to time t1.

Figure 18:
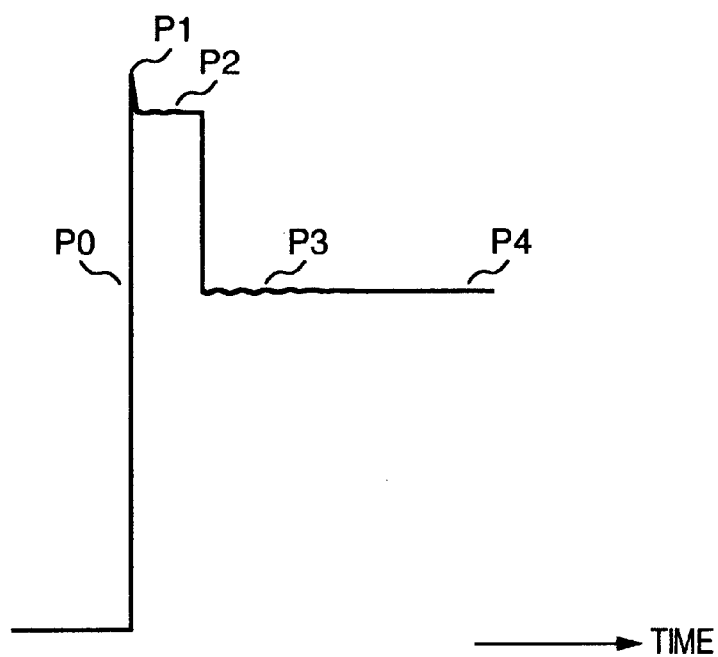
FIG. 18 is a waveform view of a switching voltage in the present invention.

As mentioned above, the lag of the formation of the negative feedback path due to the presence of the parasitic inductance Lw2 is remarkably improved in the present embodiment. As a result, the negative feedback path is quickly formed against the kickback voltage having high dv/dt. Conventional high peak voltage is improved so that it is placed to a lower voltage as shown as the peak voltage in FIG. 18.

Figure 16:
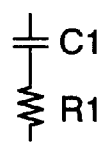
FIG. 16 is a circuit diagram of an example radio frequency oscillation absorbing circuit which is used in the present invention.
Figure 17:
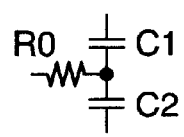
FIG. 17 is a circuit diagram of another example radio frequency oscillation absorbing circuit which is used in the present invention.

A reference numeral 10 denotes a radio frequency oscillation absorbing circuit which is connected between the nodes on the sides of the drain and the source of the NMOS transistor 14. The oscillation absorbing circuit may comprise a series of a capacitor and a resistor as shown in FIG. 16 or only one capacitor. The role of the oscillation absorbing circuit is to absorb both the radio frequency oscillation due to the negative feedback operation on generation of the surge voltage and the radio frequency oscillation caused by Lw1 and the parasitic capacitance (not shown) after the completion of the clamping. Since the prior art snubber circuit serves to absorb the high kickback voltage per se, it requires a capacitor having a high capacitance which is several $\mu F$ or more. In contrast to this, the radio frequency oscillation absorbing circuit uses a capacitor having a low capacitance in the order of 1/1000 of that of the conventional high capacitance capacitor. This improves the wave forms of the oscillation as shown at P2 and P3 in FIG. 18.

Since the surge voltage due to kickback can be quickly clamped in the power inverter according to an embodiment as mentioned above, it is not necessary to provide the rated voltage of the switching element with excessive margin. Accordingly, a switching element having a turn-on resistance lower than that of the prior art can be used, so that a power inverter which is less in size, cost and turn-on loss can be realized. Since the radio frequency oscillation in switched waveform can be suppressed to a sufficiently low level in the power inverter according to the present embodiment, a power inverter which emits less EMI noise which otherwise gives an adverse influence upon peripheral electronic circuits and equipment can be implemented.

Figure 2:
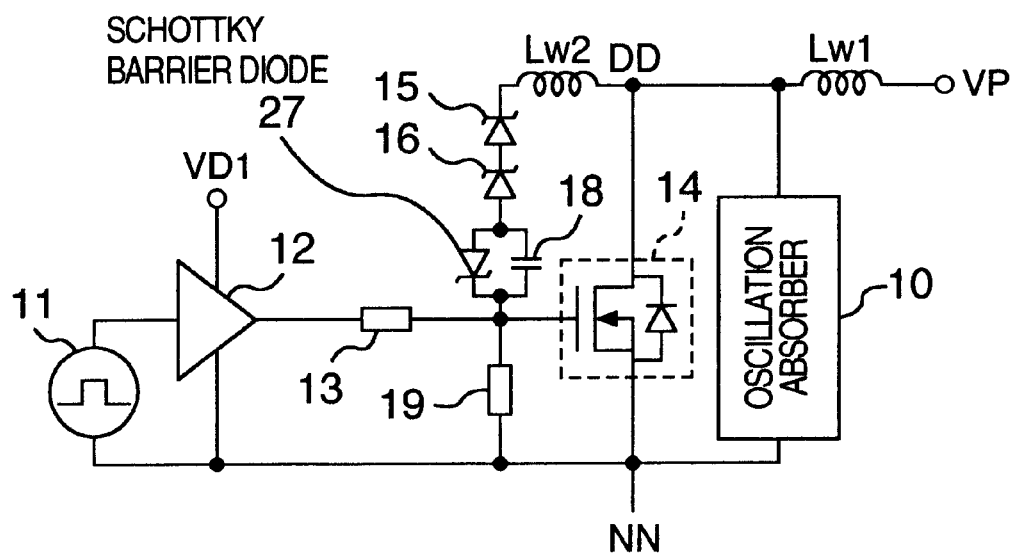
FIG. 2 is a circuit diagram of a power inverter according to a second embodiment of the present invention.

A second embodiment of the present invention is illustrated in FIG. 2. In the figure, reference numerals 11, 12, 13 and 14 denote an on-off-control signal, driver, resistor and NMOS transistor, respectively. The output of the driver 12 is connected to the gate of the NMOS transistor 14 via the resistor 13. Reference numerals 14 and 15 denote series-connected constant voltage diodes having their cathodes which are connected to the drain of the NMOS transistor 14. A reference numeral 27 is a Schottky barrier diode having its anode and cathode which are connected to the anode of the constant voltage diode 16 and the gate of the NMOS transistor 14, respectively. A capacitor 18 is connected in parallel with the Schottky barrier diode 27. A reference Lw1 denotes the parasitic inductance of the wiring of a power source VP and Lw2 denotes the parasitic inductance which is a total inductance of the inductances of the respective terminals of the constant voltage diodes 15 and 16 and the diode 17 and the inductance of the wiring which connects them. A reference numeral 10 denotes radio frequency oscillation absorbing means which is connected between the drain and the source of the NMOS transistor.

The second embodiment is substantially identical with the embodiment in FIG. 1 except that the junction type diode which is the reverse-blocking diode in the circuit provided between the drain and the gate of the NMOS transistor is replaced with the Schottky barrier diode 27. Since the Schottky barrier diode 27 has the forward voltage which is about half of that of the junction type diode, the forward recovery time is shortened by the time corresponding to the difference therebetween. This causes the feedback path to be quickly formed for the kickback voltage, which provides an advantage that the peak P1 of the surge voltage shown in FIG. 18 can be further lowered. The operation of this circuit and the effect when this circuit is used for the power converter are identical with those in FIG. 1.

Figure 3:
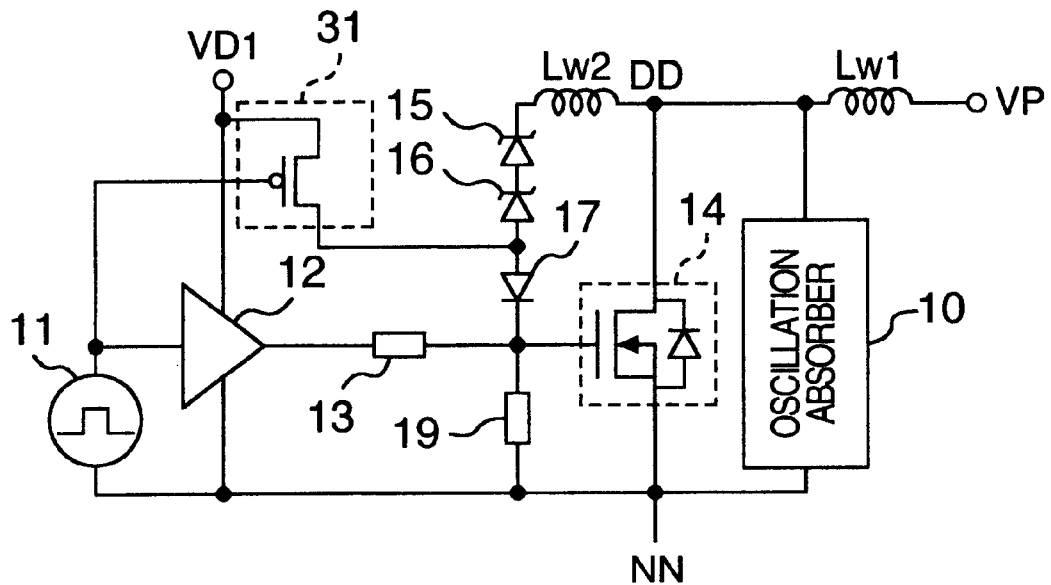
FIG. 3 is a circuit diagram of a power inverter according to a third embodiment of the present invention.

A third embodiment of the present invention is illustrated in FIG. 3. In the figure, reference numerals 11, 12, 13 and 14 denote an on-off control signal, driver, resistor and NMOS transistor, respectively. The output of the driver 12 is connected to the gate of the NMOS transistor 14 via the resistor 13. Reference numerals 14 and 15 denote series-connected constant voltage diodes having their cathodes which are connected to the drain of the NMOS transistor 14. A diode 17 has its anode and cathode which are connected to the anode of the constant voltage diode 16 and the gate of the NMOS transistor 14, respectively. Bias current supply means 31 is further provided between the connecting point between the constant voltage diode 16 and the diode 17, and a power supply VD1. A reference Lw1 denotes the parasitic inductance of the wiring of a power source VP and Lw2 denotes the parasitic inductance which is the total inductance of the inductances of the respective terminals of the constant voltage diodes 15 and 16 and the diode 17 and the inductance of the wiring which is connected therebetween. A reference numeral 10 denotes a radio frequency oscillation absorbing circuit which is connected between the drain and the source of the NMOS transistor.

When the on-off control signal 11 is a signal for turning on the NMOS transistor 14, a small current is caused to flow through the diode 17 from the bias current supply means 31 so that the diode 17 is forward-biased in advance at about 0.7 V. This causes a forward current to also flow through the diode 17 immediately when the current begins to flow through the constant voltage diodes 15, 16 due to occurrence of the kickback voltage. Since the forward recovery time of the diode 17 becomes substantially zero by this bias effect, the feedback path is more quickly formed for the kickback voltage, so that the peak P1 of the surge voltage shown in FIG. 18 can be advantageously lowered.

The operation of this circuit and the effect when this circuit is used for the power inverter are identical with those in FIG. 1.

Figure 4:
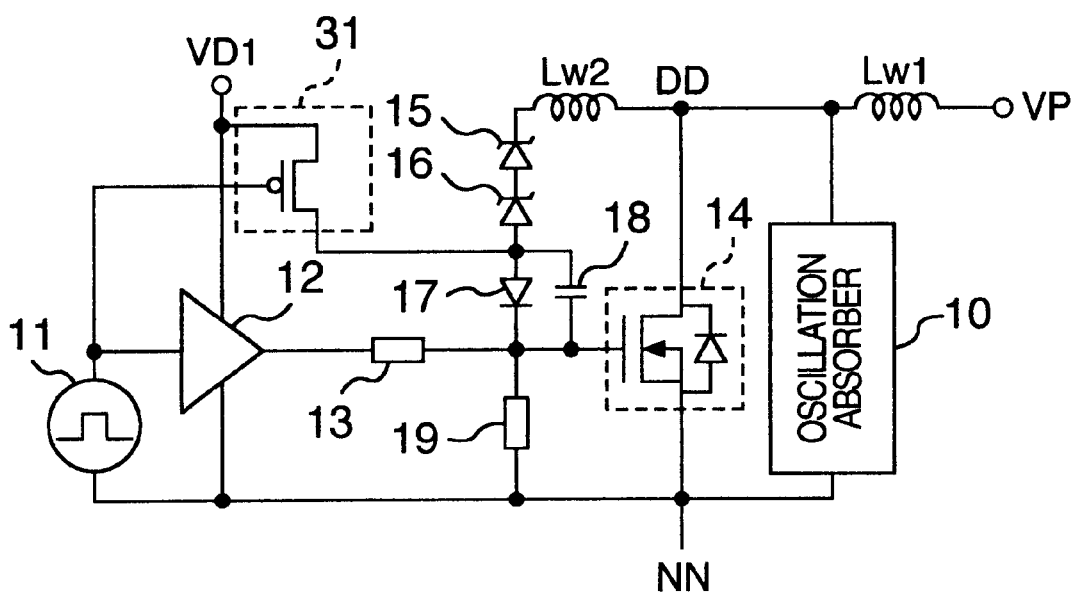
FIG. 4 is a circuit diagram of a power inverter according to a fourth embodiment of the present invention.

A fourth embodiment of the present invention is illustrated in FIG. 4. In the figure, reference numerals 11, 12, 13 and 14 denote an on-off control signal, driver, resistor and NMOS transistor, respectively. The output of the driver 12 is connected to the gate of the NMOS transistor 14 via the resistor 13. Reference numerals 14 and 15 denote series-connected constant voltage diodes having their cathodes which are connected to the drain of the NMOS transistor 14. A diode 17 has its anode and cathode which are connected to the anode of the constant voltage diode 16 and the gate of the NMOS transistor 14, respectively. A capacitor 18 is connected in parallel with the diode 17. A reference Lw1 denotes a parasitic inductance of the wiring of a power source VP and Lw2 denotes a parasitic inductance which is the total inductance of the inductances of the respective terminals of the constant voltage diodes 15 and 16 and the diode 17 and the inductance of the wiring which is connected therebetween. A reference numeral 10 denotes a radio frequency oscillation absorbing means which is connected between the drain and the source of the NMOS transistor.

When the on-off control signal 11 is a signal for turning on the NMOS transistor 14, a small current is caused to flow through the diode 17 from the bias current supply means 31 so that the diode 17 is forward-biased in advance at about 0.7 V. The present embodiment is substantially identical with that in FIG. 3 except that the capacitor 18 is connected in parallel with the diode 17. The feedback path is more quickly formed for the kickback voltage due to the bias effect of the diode and the cancellation effect on the inductive impedance of the feedback path by the capacitor 18, so that the peak P1 of the surge voltage shown in FIG. 18 can be advantageously lowered. The operation of this circuit and the effect when this circuit is used for the power converter are identical with those in FIG. 1.

Figure 5:
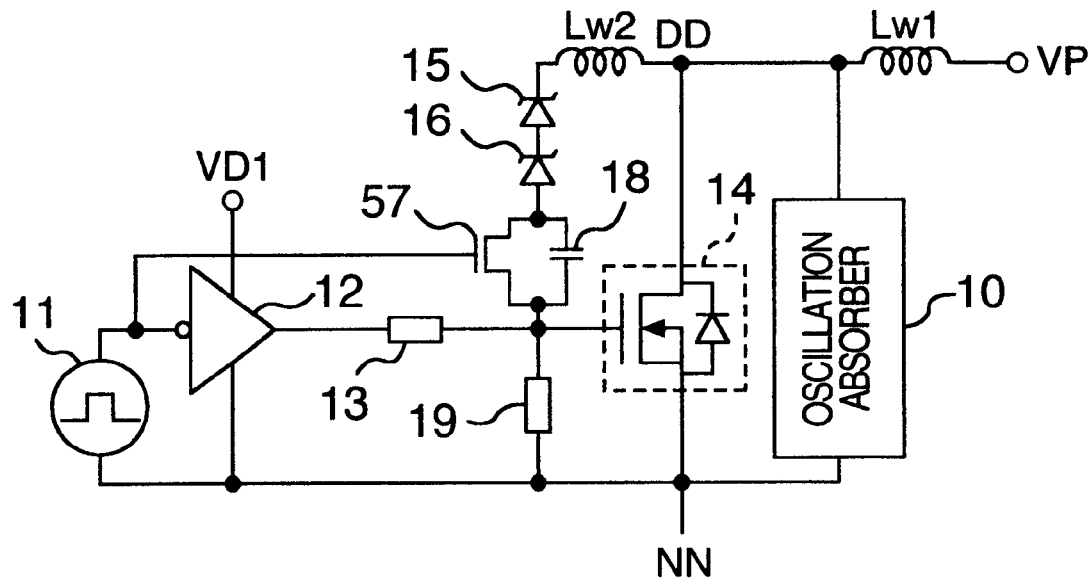
FIG. 5 is a circuit diagram of a power inverter according to a fifth embodiment of the present invention.

A fifth embodiment of the present invention is illustrated in FIG. 5. In the figure, reference numerals 11, 12, 13 and 14 denote an on-off-control signal, driver, resistor and NMOS transistor, respectively. The output of the driver 12 is connected to the gate of the NMOS transistor 14 via the resistor 13. Reference numerals 14 and 15 denote series-connected constant voltage diodes having their cathodes which are connected to the drain of the NMOS transistor 14. A reference numeral 57 denotes an NMOS transistor having the drain which is connected to the anode of the constant voltage diode 16, the source which is connected with the gate of the NMOS transistor 14 and the gate which is connected to the control signal 11. A capacitor 18 is connected in parallel with the NMOS transistor 57. A reference Lw1 denotes the parasitic inductance of the wiring of a power source VP and Lw2 denotes the parasitic inductance which is a total inductance of the inductances of the respective terminals of the constant voltage diodes 15 and 16 and the diode 17 and the inductance of the wiring which is connected therebetween. A reference numeral 10 denotes a radio frequency oscillation absorbing circuit which is connected between the drain and the source of the NMOS transistor.

In the present embodiment, NMOS 57 which is controlled in response to the on-off control signal 11 has functions which are equivalent to those of the reverse-blocking diode used in FIGS. 1 to 4. Since the NMOS transistor has been turned on prior to the occurrence of the kickback voltage, the forward recovery becomes faster like the diode, so that the peak P1 of the surge voltage shown in FIG. 18 can be further lowered. The other operation of this circuit and the effect when this circuit are used for the power converter is identical with those in FIG. 1.

Figure 6:
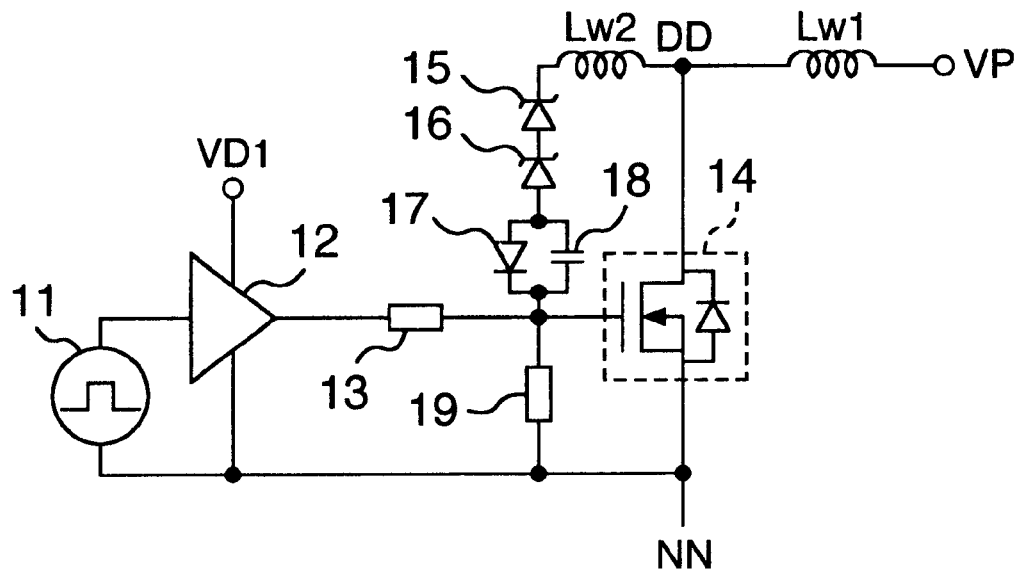
FIG. 6 is a circuit diagram of a power inverter according to a sixth embodiment of the present invention.

A sixth embodiment of the present inventing is illustrated in FIG. 6. In the figure, reference numerals 11, 12, 13 and 14 denote an on-off control signal, driver, resistor and NMOS transistor, respectively. The output of the driver 12 is connected to the gate of the NMOS transistor via the resistor 13. Reference numerals 14 and 15 denote series-connected constant voltage diodes having their cathodes which are connected to the drain of the NMOS transistor 14. A diode 17 has its anode and cathode which are connected to the anode of the constant voltage diode 16 and the gate of the NMOS transistor 14, respectively. A capacitor 18 is connected in parallel with the diode 17. A reference Lw1 denotes the parasitic inductance of the wiring of a power source VP and Lw2 denotes a parasitic inductance which is a total inductance of the inductances of the respective terminals of the constant voltage diodes 15 and 16 and the diode 17 and the inductance of the wiring which connects them. The present embodiment is substantially identical with the embodiment in FIG. 1 except that the radio frequency oscillation absorbing means 10 is omitted. The application in which the present embodiment is effective is an application in which the embodiment is applied to a system in which the negative feedback oscillation on clamping of the surge voltage is low and that the parasitic inductance of the wiring can be made low so that a problem of the oscillation due to resonance does not substantially occur. In this case, reduction in the number of parts of the system and the mounting area in comparison to the embodiment in FIG. 1 is achieved. The operation of this circuit and the effect when this circuit is used for the power converter are identical to those in FIG. 1.

Figure 7:
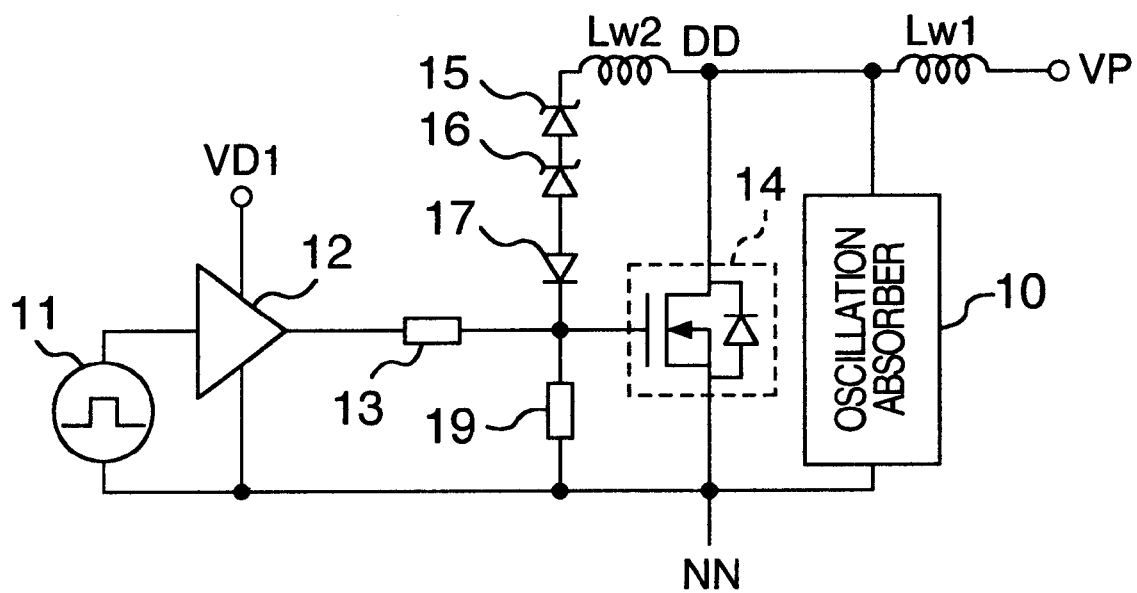
FIG. 7 is a circuit diagram of a power inverter according to a seventh embodiment of the present invention.

A seventh embodiment of the present inventing is illustrated in FIG. 7. In FIG. 1, reference numerals 11, 12, 13 and 14 denote an on-off control signal, driver, resistor and NMOS transistor, respectively. The output of the driver 12 is connected to the gate of the NMOS transistor 14 via the resistor 13. Reference numerals 14 and 15 denote series-connected constant voltage diodes having their cathodes which are connected to the drain of the NMOS transistor 14. A diode 17 has its anode and cathode which are connected to the anode of the constant voltage diode 16 and the gate of the NMOS transistor 14, respectively. A reference Lw1 denotes a parasitic inductance of the wiring of a power source VP and Lw2 denotes the parasitic inductance which is a total inductance of the inductances of the respective terminals of the constant voltage diodes 15 and 16 and the diode 17 and the inductance of the wiring which is connected therebetween. A reference numeral 10 denotes a radio frequency oscillation absorbing circuit which is connected between the drain and the source of the NMOS transistor 14.

The present embodiment is substantially identical with that in FIG. 1 except that the capacitor which is connected in parallel with the reverse-blocking diode in the circuit between the drain and the gate of NMOS transistor 14 is omitted. The application in which the present embodiment is effective is an application in which the embodiment is applied to a system in which the negative feedback oscillation on clamping of the surge voltage is low and that the parasitic inductance of the wiring is low so that the resonance oscillation due to the parasitic induction Lw1 and the parasitic capacitance does not matter. In this case, reduction i n the number of parts of the system and the mounting area in comparison to the embodiment in FIG. 1 is achieved. The operation of this circuit and the effect when this circuit is used for the power converter are identical to those in FIG. 1.

Figure 8:
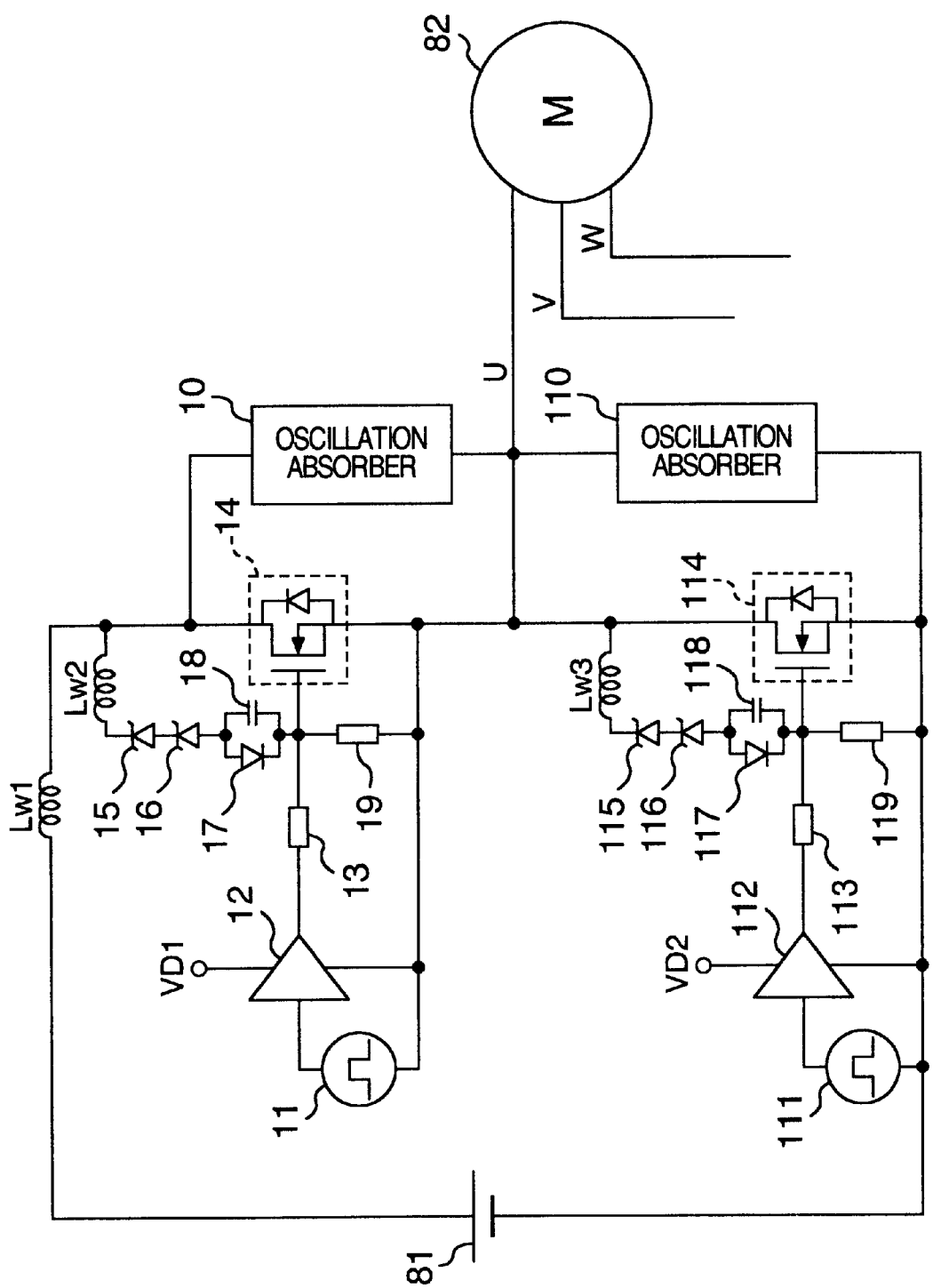
FIG. 8 is a circuit diagram of a power inverter according to an eighth embodiment of the present invention.

An eighth embodiment of the present invention is illustrated in FIG. 8. In the figure, reference numerals 11, 12, 13 and 14 denote an on-off control signal, driver, resistor and NMOS transistor having its source connected to U-phase of three-phase electric motor 82, respectively. The output of the driver 12 is connected to the gate of the NMOS transistor 14 via the resistor 13. Reference numerals 14 and 15 denote series-connected constant voltage diodes having their cathodes which are connected to the drain of the NMOS transistor 14.

A diode 17 has its anode and cathode which are connected to the anode of the constant voltage diode 16 and the gate of the NMOS transistor 14, respectively. A capacitor 18 is connected in parallel with the diode 17. A reference Lw1 denotes a parasitic inductance of the wiring of a power source VP and Lw2 denotes the parasitic inductance which is a total inductance of the inductances of the respective terminals of the constant voltage diodes 15 and 16 and the diode 17 and the inductance of the wiring which is connected therebetween. A reference numeral 10 denotes a radio frequency oscillation absorbing circuit which is connected between the drain and the source of the NMOS transistor. Similarly, reference numerals 111, 112, 113 and 114 denote an on-off control signal, driver, resistor and NMOS transistor having its drain connected to U-phase of three-phase electric motor 82, respectively. The output of the driver 112 is connected to the gate of the NMOS transistor 114 via the resistor 113. Reference numerals 114 and 115 denote series-connected constant voltage diodes having their cathodes which are connected to the drain of the NMOS transistor 114. A diode 117 has its anode and cathode which are connected to the anode of the constant voltage diode 116 and the gate of the NMOS transistor 114, respectively. A capacitor 118 is connected in parallel with the diode 117. A reference Lw3 denotes a parasitic inductance which is the total inductance of the inductances of the respective terminals of the constant voltage diodes 115 and 116 and the diode 117 and the inductance of the wiring which is connected therebetween. A reference numeral 110 denotes a radio frequency oscillation absorbing circuit which is connected between the drain and the source of the NMOS transistor. The operation of above-mentioned respective circuits is identical to that in FIG. 1. A circuit which is identical to the above-mentioned circuit is provided for each of the other V and W phases of the three-phase electric motor 82. The on-off control signals 11, 111 and relevant on-off control signal for the other phases (phases V and W) are consecutively applied in a predetermined sequence to provide the three-phase electric motor 82 with an a.c. power.

Since the surge voltage due to kickback can be quickly clamped in the three-phase power inverter according to the present embodiment, it is not necessary to provide the rated voltage of the switching elements 14, 114 with excessive margin. Accordingly, switching elements having a turn-on resistance lower than that of the prior art can be used, so that a power inverter which is less in size, cost and turn-on loss can be implemented. Since the radio frequency oscillation in switched wave form can be suppressed to a sufficiently low level by means of radio frequency oscillation absorbing means in the three-phase power inverter according to the present embodiment, a power inverter which emits less EMI noise which otherwise gives an adverse influence upon peripheral electronic circuits and equipment can be implemented.

Figure 9:
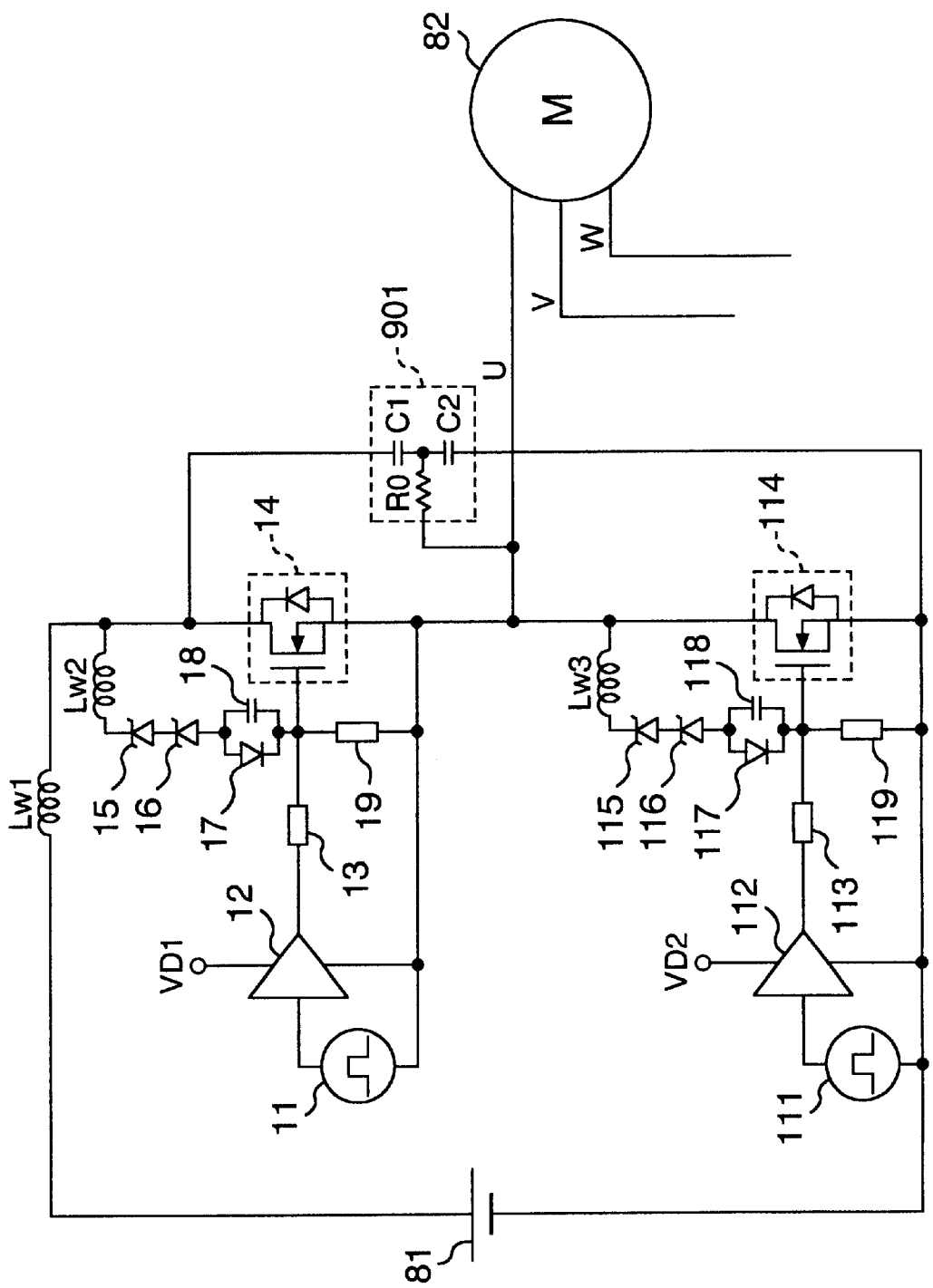
FIG. 9 is a circuit diagram of a power inverter according to a ninth embodiment of the present invention.

A ninth embodiment of the present invention is illustrated in FIG. 9. In the present embodiment, three-terminal radio frequency oscillation absorbing means 901 is provided in lieu of the radio frequency oscillation absorbing circuits 10, 110 in FIG. 8. This absorbing means 901 comprises series-connected capacitors C1 and C2, which are connected to the positive and negative terminals of a power source 81. A resistor RO is connected between the connection between the capacitors C1 and C2 and the connection between the NMOS transistors 14, 114 (U-phase in the figure). In this arrangement, the radio frequency oscillation of the NMOS transistor 14 is absorbed by a path extending through the drain of the NMOS transistor 14—capacitor C1—resistor RO—the source of the NMOS transistor 14. Similarly, the radio frequency oscillation of the NMOS transistor 114 is absorbed by a path extending through the drain of the MOS transistor 114—resistor RO—capacitor C2—the source of the NMOS transistor 114. The radio frequency oscillation absorbing circuit of the present embodiment not only can absorb the radio frequency oscillation on switching of the NMOS transistors, but also serves as a bypass capacitor for the power source since the capacitor C1 and C2 are connected in series with the positive and negative terminals of the power source 81 as is apparent from the figure. The oscillation absorbing circuit also has an effect of reducing the noise of the power source. The other effects are identical to those in FIG. 8.

Figure 20:
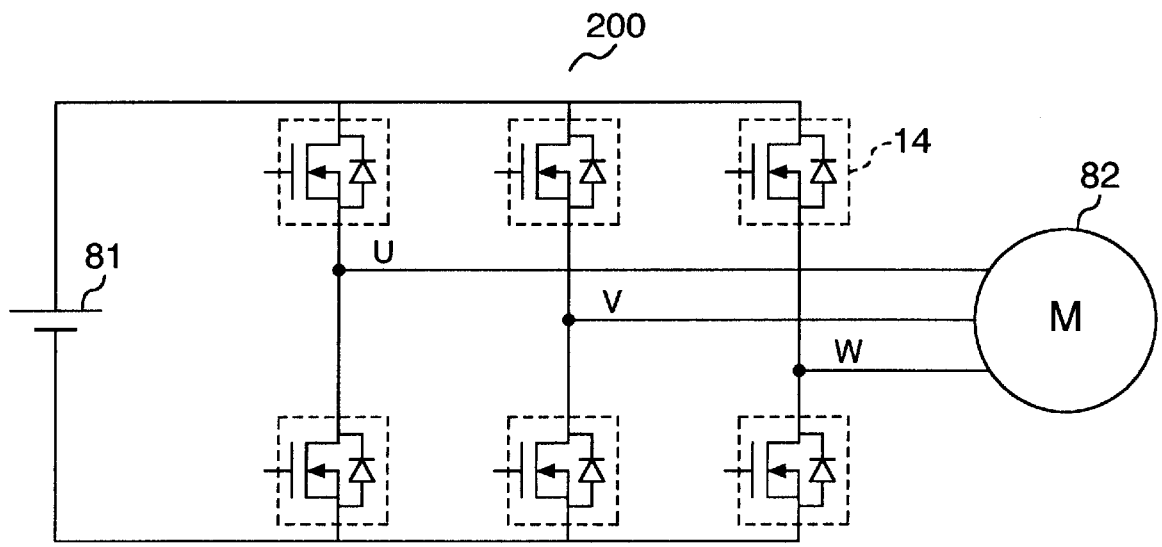
FIG. 20 is a circuit diagram showing an example in which the present invention is applied to a three-phase inverter.

A main circuit of a three-phase inverter to which the embodiment in FIG. 8 or 9 is applied is shown in FIG. 20. In the figure, the driver and the circuit for absorbing the oscillation are omitted for clarity of illustration. The D.C. power of an D.C. power source 81 is converted to an A.C. power by turning on or off each of the MOSFETs which constitute a main circuit 200. The A.C. power is supplied to the three-phase induction electric motor 82 for driving the same. Each MOSFET is turned on or off by PWM control, etc. Although each MOSFET is illustrated in the upper and lower arms of each phase in FIG. 20, a plurality of MOSFETs may be connected in series, in parallel or in series-parallel.

Figure 10:
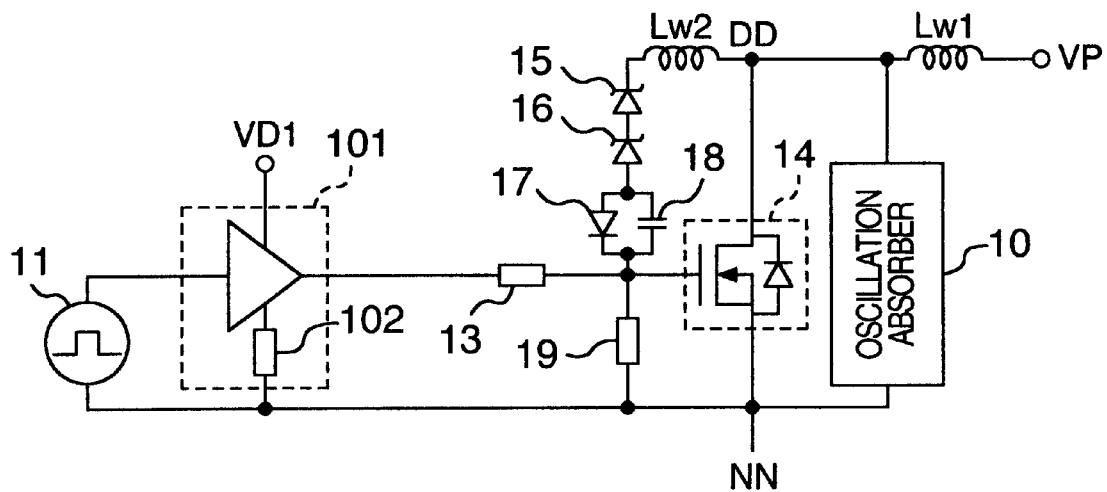
FIG. 10 is a circuit diagram of a power inverter according to a tenth embodiment of the present invention.

A tenth embodiment of the present invention is illustrated in FIG. 10. In the figure, reference numerals 11, 12, 13 and 14 denote an on-off control signal, driver, resistor and NMOS transistor, respectively. The output of the driver 12 is connected to the gate of the NMOS transistor 14 via the resistor 13. Reference numerals 14 and 15 denote series-connected constant voltage diodes having their cathodes which are connected to the drain of the NMOS transistor 14. A diode 17 has its anode and cathode which are connected to the anode of the constant voltage diode 16 and the gate of the NMOS transistor 14, respectively. A capacitor 18 is connected in parallel with the diode 17. A reference Lw1 denotes a parasitic inductance of the wiring of a power source VP and Lw2 denotes a parasitic inductance which is a total inductance of the inductances of the respective terminals of the constant voltage diodes 15 and 16 and the diode 17 and the inductance of the wiring which is connected therebetween. A reference numeral 10 denotes a radio frequency oscillation absorbing circuit which is connected between the drain and the source of the NMOS transistor.

Figure 13:
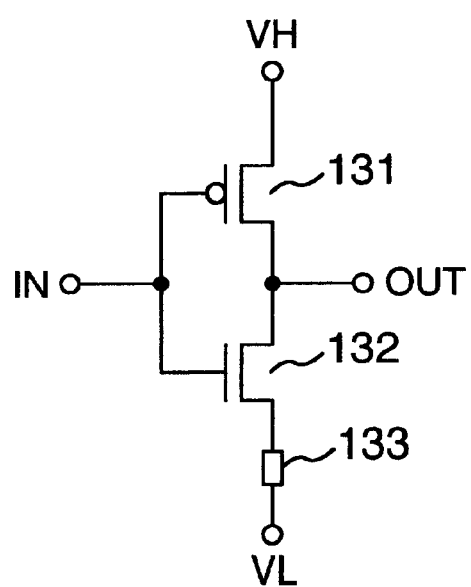
FIG. 13 is a circuit diagram of an example driver capable of limiting a sink current, which is used in the present invention.
Figure 14:
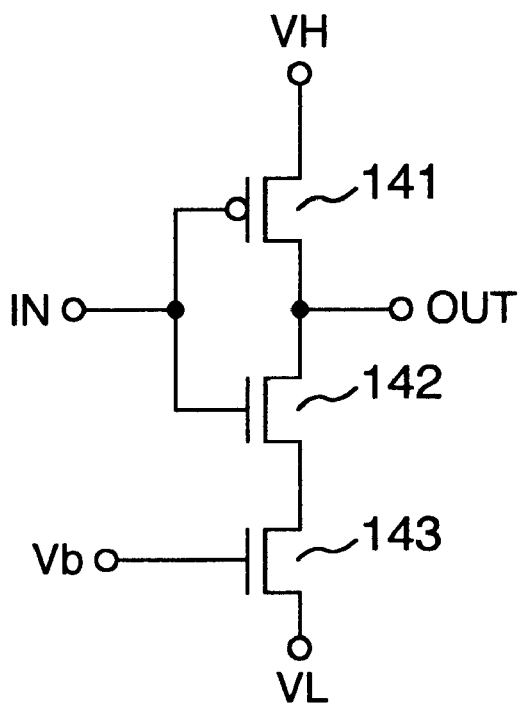
FIG. 14 is a circuit diagram of another example driver capable of limiting a sink current, which is used in the present invention.

The present embodiment is substantially identical with the embodiment in FIG. 1 except that the driver 101 has a capability of limiting the output sink current unlike the usual drivers. Embodiments of the driver having a sink current limiting capability are shown in FIGS. 13 and 14. In FIG. 13, PMOS 131 and NMOS 132 constitute a common CMOS converter. A resistor 133 is connected between the NMOS 132 and a low voltage power source VL. In this arrangement, a resister does not act as only an impedance, but gives a negative feedback action on the bias voltage between the gate and the source of the NMOS 132. In other word, stronger negative feedback takes place as higher current flows, resulting in that the resistor will act to suppress the current. In the example in FIG. 14, the PMOS 141 and NMOS 142 constitute a common CMOS inverter. An NMOS 143 having its gate which is biased at a predetermined voltage Vb is connected between the source of the NMOS 142 and the low voltage power source VL. In this arrangement, the sink current flowing through the NMOS 142 is limited to the current value of a constant current circuit including the NMOS 143. Use of the driver having the above-mentioned capability of limiting the above-mentioned sink current allows the current flowing through the constant voltage diodes 15, 16 to be restricted to a predetermined lower value when the surge voltage clamping operation is conducted by these constant voltage diodes. Accordingly, low current parts which are inexpensive and compact can be advantageously used. The other effects are identical with those in FIG. 1.

Figure 11:
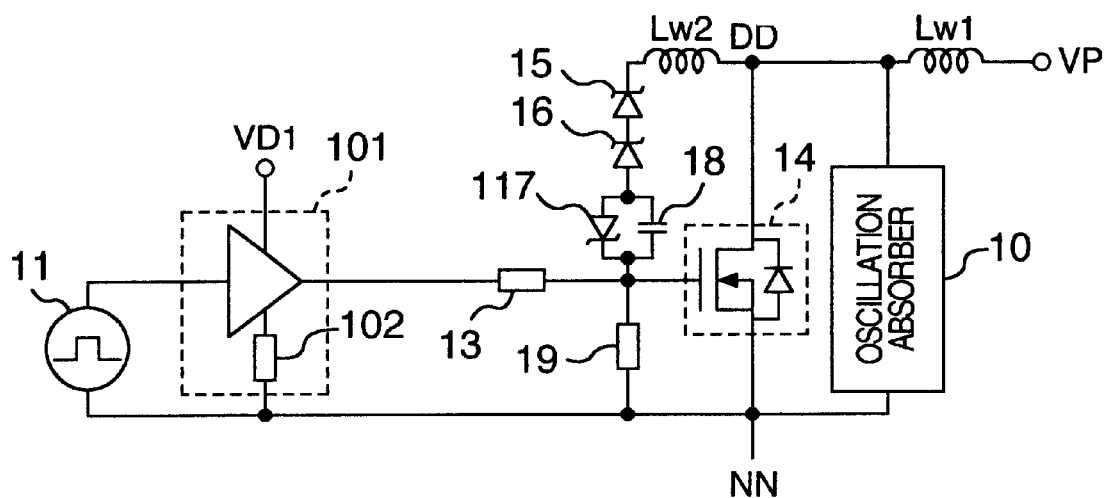
FIG. 11 is a circuit diagram of a power inverter according to an eleventh embodiment of the present invention.

An eleventh embodiment of the present invention is shown in FIG. 11. The present embodiment is substantially identical to the embodiment in FIG. 10 except that the reverse-blocking diode is replaced with a Schottky barrier diode 117. The effect of the Schottky barrier diode is identical with that which has been described with reference to the embodiment in FIG. 2. The effect of the driver 101 having a capability of restricting the sink current is identical to that which has been described in the description of the embodiment in FIG. 10. The other effects are identical to that in FIG. 1.

Figure 15:
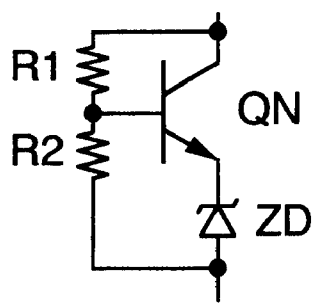
FIG. 15 is a circuit diagram of a voltage limiting circuit which is used in the present invention.

Another embodiment of the constant voltage element is shown in FIG. 15. Although zener diodes are used as the voltage constant voltage element in the embodiments in FIGS. 1 to 11, a bipolar transistor and two resistors are additionally used. This allows a desired constant voltage to be finely set only by changing the ratio of the resistor R1 to the resistor R2.

Figure 19:
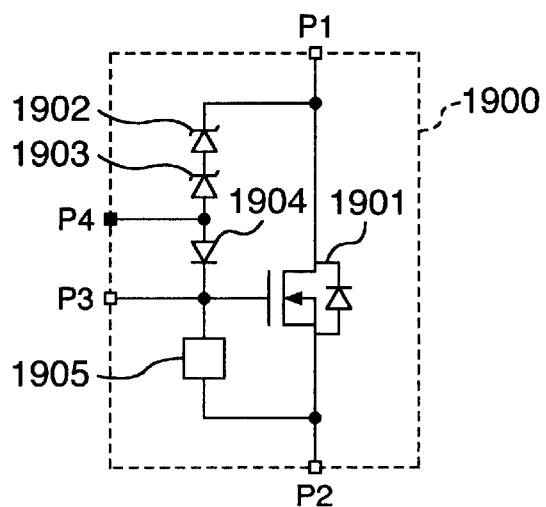
FIG. 19 is a circuit diagram of a power inverter according to a twelfth embodiment of the present invention.

A preferred semiconductor which is preferred for the power inverter of the present invention is shown in FIG. 19. In the figure, reference numerals 1900, 1901, 1902, 1903, 1904 and 1905 denote a semiconductor chip, NMOS transistor, constant voltage elements, diode and gate protecting element for the NMOS transistor 1901. P1 to P4 denote terminals leading from the semiconductor chip to the outside thereof. Although conventional semiconductor device has at least three external terminals P1 to P3, the device has an additional fourth terminal P4 in addition to the above-mentioned external terminals.

The fourth terminal P4 is led from a connection between the anode of the constant voltage element 1903 and the anode of the diode 1904. Addition of this terminal P4 provides an advantage that the active clamping circuit in the embodiment in FIG. 1 can be formed of only one externally added capacitor. Since the elements 1901 to 1904 are formed on the same semiconductor chip, the inductance which is parasitic to each terminal is very lower than that of conventional discrete part. Accordingly, the capacitance of the external capacitor 1 can be made lower.

The foregoing embodiments are applicable to various voltage driven semiconductor switching elements such as semiconductor devices which have an isolated gate, for example, MOSFET as well as IGBT.

Since the surge voltage due to kickback can be quickly clamped in the power inverter in accordance with the present invention, it is not necessary to provide the rated voltage of the switching element with excessive margin. Accordingly, a switching element having a turn-on resistance lower than that of the prior art can be used, so that a power inverter which is less in size, cost and turn-on loss can be implemented. Since the radio frequency oscillation in switched wave form can be suppressed to a sufficiently low level in the power inverter according to the present embodiment, a power inverter which emits less EMI noise which otherwise gives an adverse influence upon peripheral electronic circuits and equipment can be implemented.

What is claimed is:

1. A power inverter comprising a high-speed switching element for rendering a path between a first and second terminals of a main circuit conducting or nonconducting in response to a signal input to an on-off control terminal of the switching element, and an active clamping circuit provided between said first terminal and said on-off control terminal, and said active clamping circuit comprising a constant voltage limiting circuit and a parallel-connected circuit formed of a capacitor and a reverse-blocking diode, and said parallel-connected circuit connected in series with said constant voltage limiting circuit, and said reverse-blocking diode connected to said on-off control terminal.

2. A power inverter as claimed in claim 1 wherein said reverse-blocking diode connected in parallel with said capacitor is a junction type diode.

3. A power inverter as claimed in claim 1 wherein said reverse-blocking diode connected in parallel with said capacitor is a Schottky barrier diode.

4. A power inverter as claimed in claim 1, further including a radio frequency oscillation absorbing circuit provided between said first and second terminals of said highspeed switching element for absorbing both a voltage oscillation caused in association with a negative feedback operation on a surge voltage clamping by said clamping circuit and a voltage oscillation caused due to a parasitic resonance after the completion of the surge voltage clamping.

5. A power inverter as claimed in claim 4, further including a circuit for supplying a forward biasing current to said reverse-blocking diode of said active clamping circuit when said signal serves to turn off said high-speed switching element.

6. A power inverter comprising two pairs of series-connected inverter circuits, each comprising a high-speed switching element for rendering a path between a first and second terminals of a main circuit conducting or non conducting in response to a signal input to an on-off control terminal of the switching element, and an active clamping circuit provided between said first terminal and said on-off control terminal, said active clamping circuit in each inverter circuit comprising a constant voltage limiting circuit and a parallel-connected circuit formed of a capacitor and a reverse-blocking diode connected in series with said voltage limiting circuit, and further comprising a radio-frequency oscillation absorbing circuit including a series-connected circuit formed of first and second capacitors between the first terminal of said first highspeed switching element and a second terminal of a second high-speed switching element and a resistor connected between the connection between said first and second capacitors and the connection between said second terminal of said first high-speed switching element and a first terminal of said second high-speed switching element.

7. A power inverter as claimed in claim 6, wherein said reverse-blocking diode connected in parallel with said capacitor is a junction type diode.

8. A power inverter as claimed in claim 6, wherein said reverse-blocking diode connected in parallel with said capacitor is a Schottky barrier diode.

9. A power inverter as claimed in claim 6, wherein said high-speed switching element is a MOS transistor.

10. A power inverter as claimed in claim 6, wherein said high-speed switching element is an Insulated Gate Bipolar Transistor (IGBT).

11. A power inverter for suppressing a surge voltage, comprising:
   a signal generator for generating a control signal;
   a power source;
   a switching element for performing a switching operation in response to the control signal, said switching element having first and second terminals coupled to the power source and a control terminal coupled to receive the control signal; and
   an active clamping circuit for clamping the surge voltage at a given voltage when the surge voltage is generated from the power source due to parasitic inductances, said active clamping circuit comprising diodes serially connected between the power source and the control terminal of the switching element to limit the surge voltage from the power source; and a reverse-blocking diode and a capacitor arranged in parallel and disposed between the serially-connected diodes and the control terminal of the switching element.

12. A power inverter as claimed in claim 11, wherein said reverse-blocking diode connected in parallel with said capacitor is a Junction-type diode.

13. A power inverter as claimed in claim 11, wherein said reverse-blocking diode connected in parallel with said capacitor is a Schottky barrier diode.

14. A power inverter as claimed in claim 11, wherein said switching element corresponds to one of a MOS transistor and an Insulated Gate Bipolar Transistor (IGBT).

15. A power inverter as claimed in claim 11, further comprising a radio frequency (RF) oscillation absorbing circuit provided between the first and second terminals of the switching element for absorbing both a voltage oscillation caused by the active clamping circuit and a voltage oscillation caused by a parasitic resonance after clamping the surge voltage.

16. A power inverter as claimed in claim 15, further comprising a bias current supply circuit provided to supply a forward bias current to the reverse-block diode, when the switching element is turned off in response to the control signal to suppress the peak of the surge voltage.

17. A semiconductor device which constitutes a power inverting unit comprising a high-speed switching element for rendering a path between a first and second terminals of a main circuit conducting or nonconducting in response to a signal input to an on-off control terminal of the switching element, and an active clamping circuit provided between said first terminal and said on-off control terminal, and external terminals led from said turn on-off control terminal, said first and second terminals, and a series-connection between a voltage limiting circuit reverse-blocking diode series-connected thereto, said reverse-blocking diode also connected to said on-off control terminal.

* * * * *